US012797297B2

(12) United States Patent
Yampolsky

(10) Patent No.: US 12,797,297 B2
(45) Date of Patent: Nov. 17, 2026

(54) PILL TRAY

(71) Applicant: Alex Yampolsky, New York, NY (US)

(72) Inventor: Alex Yampolsky, New York, NY (US)

( * ) Notice: Subject to any disclaimer, the term of this patent is extended or adjusted under 35 U.S.C. 154(b) by 0 days.

(21) Appl. No.: 19/320,444

(22) Filed: Sep. 5, 2025

(65) Prior Publication Data

US 2026/0069504 A1 Mar. 12, 2026

Related U.S. Application Data

(60) Provisional application No. 63/764,775, filed on Feb. 28, 2025, provisional application No. 63/745,964, filed on Jan. 16, 2025, provisional application No. 63/693,056, filed on Sep. 10, 2024.

(51) Int. Cl.
*A61J 7/00* (2006.01)

(52) U.S. Cl.
CPC .................................. *A61J 7/0069* (2013.01)

(58) Field of Classification Search
USPC .......................................................... 53/390
See application file for complete search history.

(56) References Cited

U.S. PATENT DOCUMENTS 3,662,904 A 5/1972 Tune
4,065,000 A * 12/1977 Murton .................... A61J 7/02 453/33
4,685,271 A * 8/1987 Ringer ...................... B65B 5/06 53/390
6,821,079 B2 11/2004 Priebe et al.
7,021,492 B2 4/2006 Priebe et al.
9,002,510 B2 * 4/2015 Chudy .................. G16H 40/20 700/242
2004/0074916 A1 4/2004 Priebe et al.
2010/0107555 A1 * 5/2010 Yuyama ............... B65B 61/025 53/131.2

FOREIGN PATENT DOCUMENTS

CN 105267043 A 1/2016
GB 2269576 A 2/1994

OTHER PUBLICATIONS

The extended European search report dated May 15, 2026, from European Application No. 25220860.8, 10 sheets.

* cited by examiner

*Primary Examiner* — Chinyere J Rushing-Tucker
(74) *Attorney, Agent, or Firm* — KATTEN MUCHIN ROSENMAN LLP

(57) ABSTRACT

A pill tray includes a container having a bottom substrate and walls surrounding the bottom substrate and protruding upwardly from the bottom substrate to provide an inner space to contain objects. The pill tray includes legs disposed under the container to support the container and a sieve plate coupled to the bottom substrate. The sieve plate has a plurality of through holes configured to receive the objects in the container. Upper portions of the legs define a first space and include slots configured to receive and support a removable plate into the first space. Lower portions of the legs provide a second space to receive a dose tray.

20 Claims, 15 Drawing Sheets

PILL TRAY

CROSS REFERENCE TO RELATED APPLICATIONS

This application claims priority to U.S. Provisional Patent Ser. No. 63/764,775, filed Feb. 28, 2025, U.S. Provisional Patent Ser. No. 63/745,964, filed Jan. 16, 2025, and U.S. Provisional Patent Application Ser. No. 63/693,056, filed Sep. 10, 2024, the entire contents of which are incorporated herein by reference.

BACKGROUND

For the organization of scheduled doses of medications, pills or tablets contained in a bottle are distributed into dose trays or pill organizers that may have a number of compartments or sections. However, distributing a large number of pills or tablets into dose trays may require extended effort and hours of work to fill the dose trays with the pills or tablets manually. Therefore, there are needs to provide an apparatus and method to efficiently distribute a large number of pills or tablets into dose trays.

SUMMARY

The disclosed invention proposes an apparatus and method to efficiently distribute pills or tablets into dose trays or pill organizers that include a number of compartments for scheduled doses of medications. The apparatus includes a container having a bottom substrate and walls surrounding the bottom substrate and protruding upwardly from the bottom substrate to provide an inner space to contain objects. The apparatus includes legs disposed under the container to support the container and a sieve plate coupled to the bottom substrate. The sieve plate has a plurality of through holes configured to receive the objects in the container. Upper portions of the legs define a first space and include slots configured to receive and support a removable plate into the first space. Lower portions of the legs provide a second space to receive a dose tray. Pills are poured on the container. While the removable plate is placed under the container, the pills are distributed inside the through holes of the bottom substrate. A dose tray is placed under the removable plate, and when the removable plate is removed, the pills in the through holes are dropped into the dose tray. The apparatus and method of the disclosed invention reduces the time for filling dose trays, and improves efficiency of distributing pills into dose trays, also preventing contamination of pills.

These advantages and others are achieved, for example, by a pill tray including a container, which includes a bottom substrate and walls surrounding the bottom substrate and protruding upwardly from the bottom substrate to provide an inner space to contain objects, a plurality of legs disposed under the container to support the container, a sieve plate coupled to the bottom substrate, and a removable plate removably disposed in the first space under the container. Upper portions of the legs includes slots defining a first space between the slots, and lower portions of the legs define a second space between the lower portions of the legs under the first space. The sieve plate has a plurality of through holes configured to receive the objects in the container. The slots of the legs are configured to receive, support and guide the removable plate. The removable plate is a plain solid plate configured to entirely cover the through holes of the sieve plate. The lower portions of the legs are configured to receive a dose tray in the second space.

The bottom substrate may have an opening and a recess, which is recessed from a top surface of the bottom substrate, along a periphery of the opening and the sieve plate is removably disposed in the opening of the bottom substrate and is supported by the recess. Alternatively, the sieve plate is integrated into the bottom substrate to provide a single body of a plate or substrate. The top surface of the sieve plate is at the same level of a top surface of the bottom substrate. The container includes an exit portion including an exit opening, through which the objects in the inner space are removed outside. The exit opening may be positioned on or above the bottom substrate. The exit portion may be placed at a corner of the container. The legs may include protrusions protruding inwardly to provide the slots between the protrusions and the bottom substrate.

The pill tray may further include a tray frame disposed under the legs. The tray frame includes a bottom plate and supporters protruding upwardly from the bottom plate. The supporters and the bottom plate define a frame inner space between the supporters to receive the dose tray, and the frame space is included in or overlaps with the second space. The supporters of the tray frame may include steps to securely support the legs, and the steps are placed between the lower portions of the legs. Each through hole of the sieve plate may be configured to receive a single object. The inner space is completely enclosed by the walls. The container includes an exit portion including an exit opening formed on one of the walls.

These advantages and others are also achieved, for example, by a method of using the pill tray. The method includes steps of placing a sieve plate in a container of the pill tray and inserting a removable plate under the container of the pill tray through slots, supplying pills inside the container, distributing the pills inside the through holes formed on the sieve plate, removing excess pills that are not distributed in the through holes, inserting dose tray under the removable plate, removing the removable plate, allowing the pills dropping onto the dose tray through the through holes, and removing the dose tray. The method may further include the step of placing a tray frame under the legs to support the container and legs. The distributing the pills may include shaking the pill tray until the through holes are filled with the pills. The removing excess pills may include removing the excess pills through an exit opening formed in the container.

BRIEF DESCRIPTION OF THE DRAWINGS

The preferred embodiments described herein and illustrated by the drawings hereinafter are to illustrate and not to limit the invention, where like designations denote like elements.

DETAILED DESCRIPTION

Figure 1:
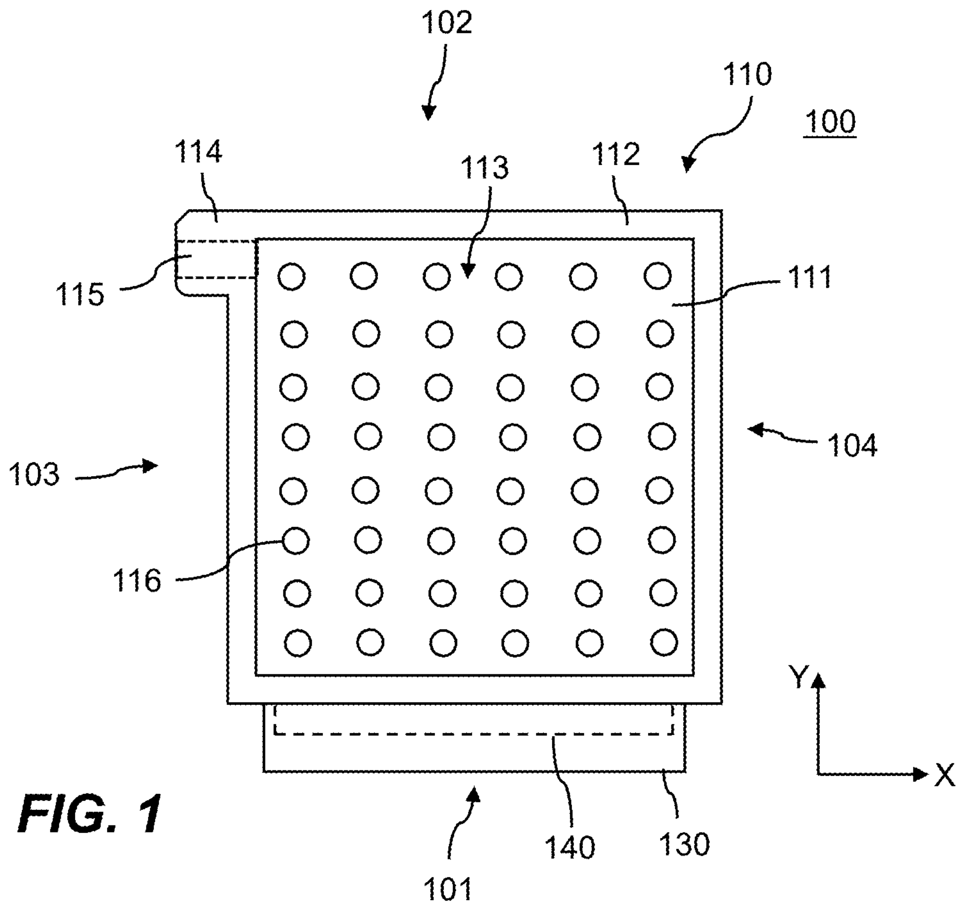
FIG. 1 is a top view of the pill tray of the disclosed invention while removable plate and dose tray are inserted in the pill tray.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

Figure 2A:
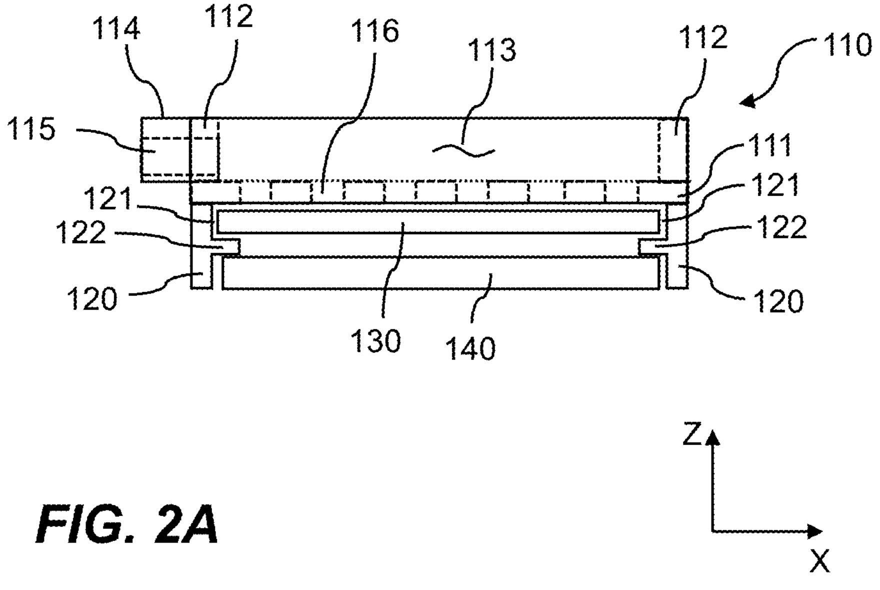
FIGS. 2A-2D are side views of a front side, rear side, left side, and right side of the pill tray while removable plate and dose tray are inserted in the pill tray.
Figure 2B:
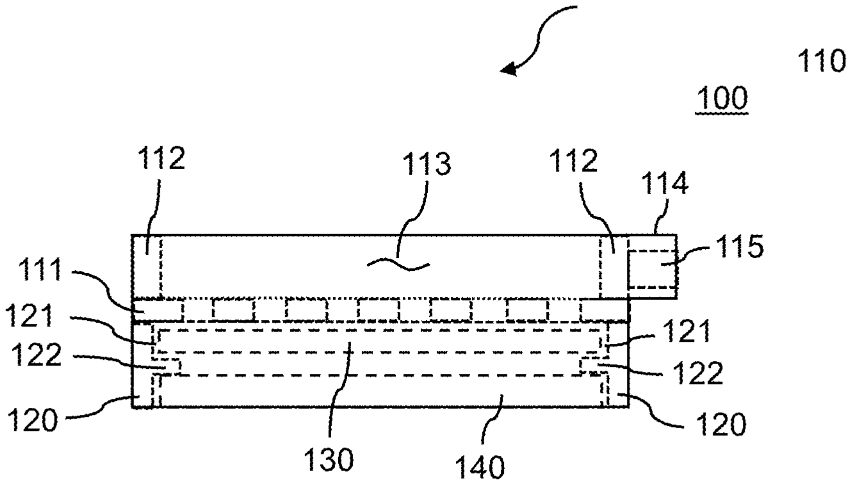
Figure 2C:
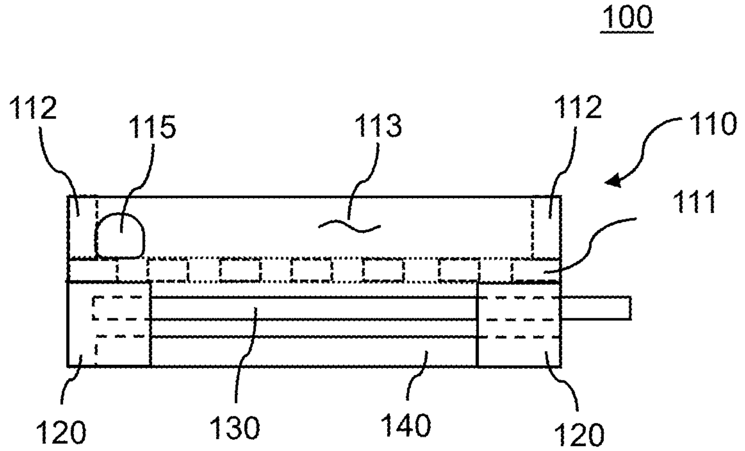
Figure 2D:
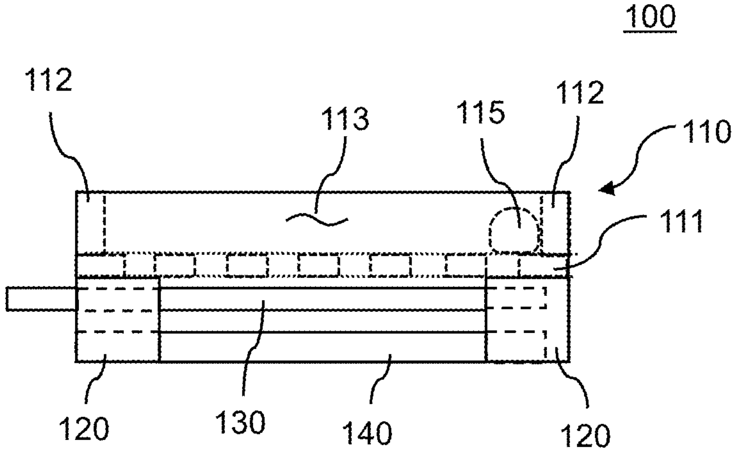
Figure 3:
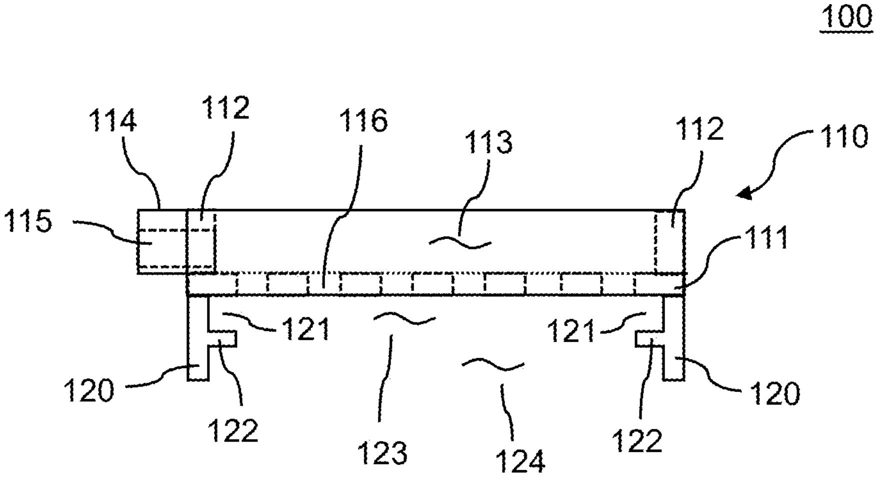
FIG. 3 is a view of the front side of the pill tray without the removable plate and the dose tray.

With reference to FIG. 1, shown is a top view of the pill tray 100 of the disclosed invention while removable plate 130 and dose tray 140 are inserted in the pill tray 100. With reference to FIGS. 2A-2D, shown are side views of front side 101, rear side 102, left side 103, and right side 104 of the pill tray 100, respectively, while removable plate 130 and dose tray 140 are inserted in the pill tray 100. With reference to FIG. 3, shown is a view of the front side 101 of the pill tray 100 without the removable plate 130 and the dose tray 140. These views are exaggerated for description purposes.

The pill tray 100 includes container 110 having bottom substrate 111 and walls 112 surrounding the bottom substrate 111 and protruding upwards from the bottom substrate 111. The walls 112 are formed along the front side 101, rear side 102, left side 103, and right side 104 of the pill tray 100. The walls 112 protrude upwards from the bottom substrate 111 so that an inner space 113 is defined by the bottom substrate 111 and the walls 112. The inner space 113 may be completely enclosed by the walls 112. The inner space 113 is configured to contain objects such as pills or tablets. The container 110 may have the shape of a box with an open top. FIG. 1 shows an exemplary top view of the container 110 having a rectangular shape. However, the shape is not limited to the rectangular shape.

The container 110 further includes an exit portion 114 at a corner of the container 110. The exit portion 114 has an exit opening 115 open to the outside and the inner space 113. Therefore, objects contained in the inner space 113 may be removed outside through the exit opening 115. The exit opening 115 may be formed on one of the walls 112. Walls 112 except the portion of the exit opening 115 are plain solid walls without any openings or grooves. The exit opening 115 is positioned on or above the bottom substrate 111. FIG. 1 shows an exemplary exit portion 114 located at a corner of the container 110. However, the exit portion 114 with the exit opening 115 may be located at any other portion of the container 110.

The bottom substrate 111 includes a plurality of through holes 116 so that objects inside the inner space 113 may also be removed through the through holes 116. Each through hole 116 may be constructed to contain a single object. However, depending on applications, each through hole 116 may be constructed to contain multiple objects. FIGS. 1-3 exemplarily show a certain number, shape, size, and orientation of the through holes 116. However, the number, shape, size, and orientation of the through holes 116 are not limited to those shown in FIGS. 1-3. For example, the through holes 116 (viewed from the top) may have circular shapes, oval shapes, rectangular shapes, square shapes, etc. depending on applications. FIGS. 1-3 show an exemplary single exit portion 114. However, the pill tray 100 of the disclosed invention may have multiple exit portions. The shape and size of the exit opening 115 are not limited to those shown in FIG. 1-3.

The pill tray 100 further includes legs 120 disposed under the container 110. The legs 120 may be attached to the lower surface of the bottom substrate 111 to support the container 110. In an embodiment, the legs 120 may be disposed at a front end portion and rear end portion of the left side 103 of the pill tray 100 and at a front end portion and rear end portion of the right side 104 of the pill tray 100. The legs 120 disposed at the rear ends of the left side 103 and right side 104 may extend along the X-axis, partially or entirely covering the rear side 102 under the container 110. The pill tray 100 includes removable plate 130 that may be a plain solid plate without any openings or grooves. The front side 101 under the container 110 may be open to receive removable plate 130 and dose tray 140. The locations and shapes of the legs 120, however, are not limited to those shown in FIGS. 2A-2D. For example, in another embodiment, the legs 120 may be forms of walls, extending along Y-axis, covering the left side 103 and right side 104 under the container 110. The pill tray 100 may have a rear wall (not shown) that covers the rear side 102 under the container 110.

The legs 120 include slots 121 extending along Y-axis to receive the removable plate 130. The slots 121 are positioned at upper portions of the legs 120, and define a first space 123 (see FIG. 3) just under the bottom substrate 111. In other words, the first space 123 is a space between the slots 121 at the left and right sides of the legs 120. The removable plate 130 is placed in the first space 123 as shown in FIG. 2A. The removable plate 130 may be slidably inserted into the first space 123 through the slots 121. The slots 121 guide and support the removable plate 130 to be stably placed under the container 110. When completely inserted, the removable plate 130 entirely covers the through holes 116 formed on the bottom substrate 111 of the container 110. Therefore, the removable plate 130 prevents objects in the inner space 113 of the container 110 from dropping through the though holes 116. In order to define the slots 121, the legs 120, for example, may include protrusions or rails 122 that inwardly protrude from the legs 120 and extend along Y-axis as shown in FIGS. 2A and 3. However, the legs 120 may have other structures, such as dents on the surfaces, to define the slots 121.

The pill tray 100 provides a second space 124 under the container 110 to receive dose tray 140. The second space 124 is defined by lower portions of the legs 120 below the upper portions of the legs 120 at which the slots 121 are formed. Therefore, the second space 124 is under the first space 123 defined by the slots 121. When inserted, the dose tray 140 is positioned below the removable plate 130.

Figure 4:
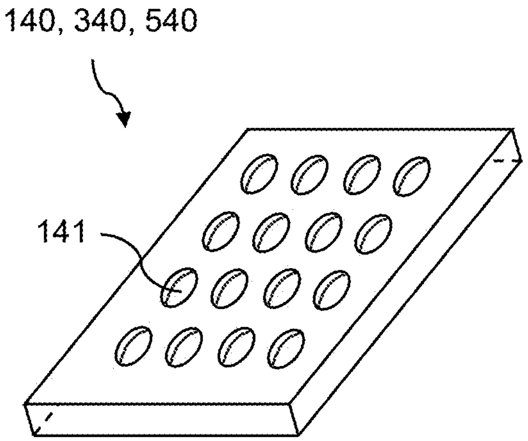
FIG. 4 is an illustration of an exemplary dose tray that may be used for the pill tray of the disclosed invention.

With reference to FIG. 4, shown is an illustration of an exemplary dose tray 140 that may be used for the pill tray 100 of the disclosed invention. The dose tray 140 has the shape of a plate including compartments (hollows or dents) 141 recessed from its surface to contain one or more pills or objects. Each compartment 141 may be constructed to securely contain one or more pills or objects. Depending on needs and applications, each compartment 141 may contain one pill or multiple pills. The number of the compartments 141 may preferably match the number of the through holes 116. However, depending on applications, the number of compartments 141 may be different from the number of the though holes 116. The shape and size of each compartment 141 may or may not match those of the through hole 116.

Figure 5:
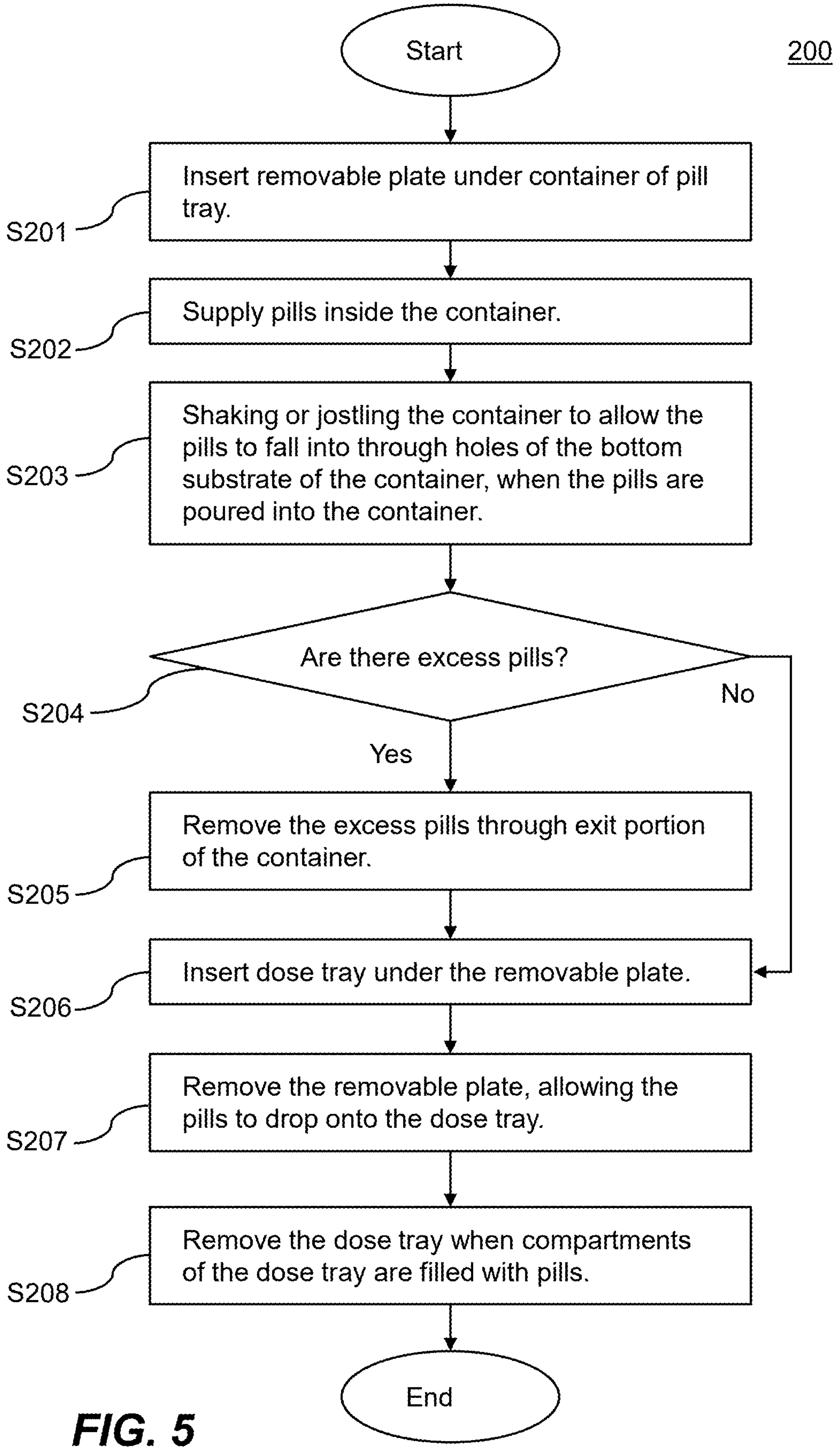
FIG. 5 is a workflow of the method of using the pill tray of the disclosed invention.

With reference to FIG. 5, shown is a workflow of method 200 of using the pill tray 100 of the disclosed invention. Removable plate 110 is inserted under container 110 of pill tray 100 through the slots 121, block S201. The removable plate 130 may be completely inserted to entirely cover the through holes 116 formed on the bottom substrate 111 of the container 110. Pills are supplied inside the container 110, block S202. The pills in the container 110 are distributed inside through holes 116 of the bottom substrate 111 of the container 110, block S203. For example, in order to distribute the pills inside the through holes 116, the pill tray 100 may be shaken until the through holes 116 are filled with the pills. When the number of pills in the container 110 is greater than the number of through holes 116, there may be excess pills that are not distributed in any of the through holes 116. If there are excess pills in the container 110, block S204, the excess pills are removed through exit portion 114 of the container 110, block S205. For example, the pill tray 100 may be tilted to lower the exit portion 114. Then, the excess pills may be removed through the exit opening 115 of the exit portion 114. When pills are distributed in the through holes 116 without excess pills, dose tray 140 is inserted under the removable plate 130, block S206. The position of the dose tray 140 may be adjusted to align the compartments 141 to the through holes 116. The removable plate 130 is removed, allowing the pills to drop onto the dose tray 140 through the through holes 116, block S207. The dropped pills are contained in the compartments 141 of the dose tray 140. The dose tray 140 is removed when compartments of the dose tray are filled with pills, block S208.

Figure 6:
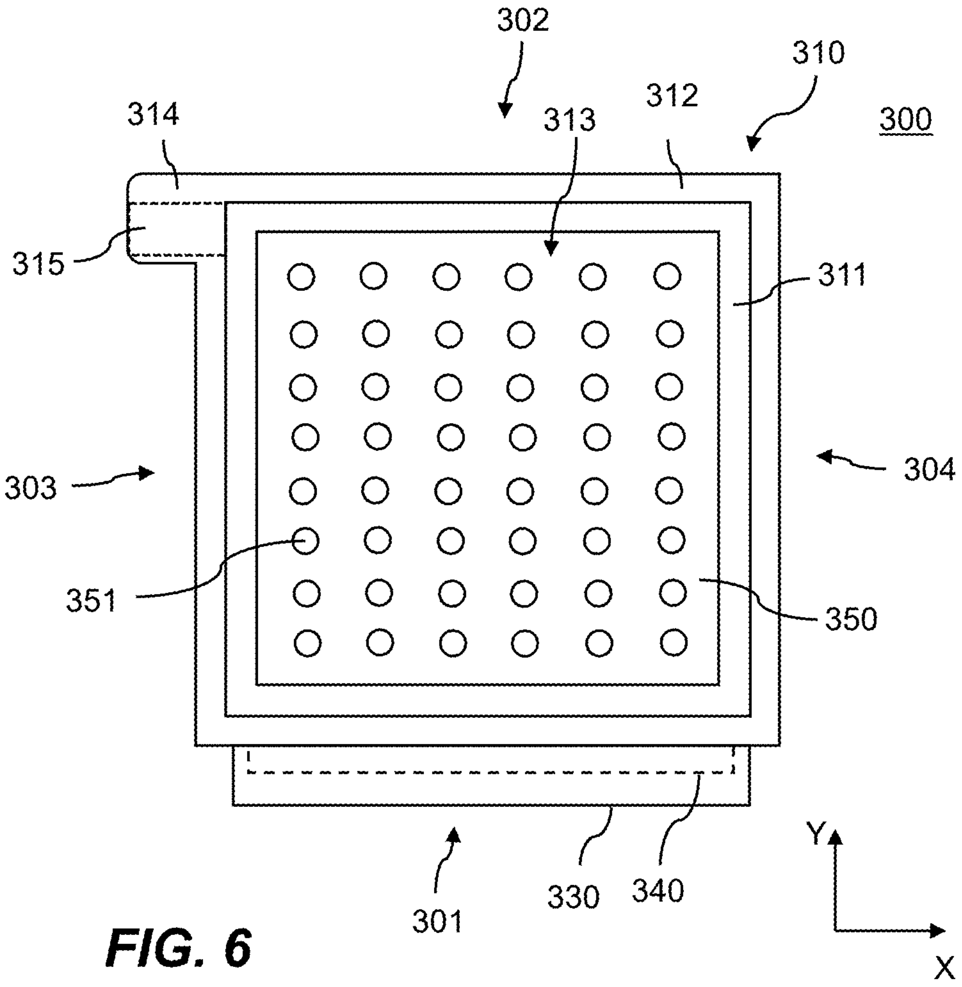
FIG. 6 is a top view of the pill tray of another embodiment of the disclosed invention while a sieve plate, removable plate and dose tray are inserted in the pill tray.
Figure 7A:
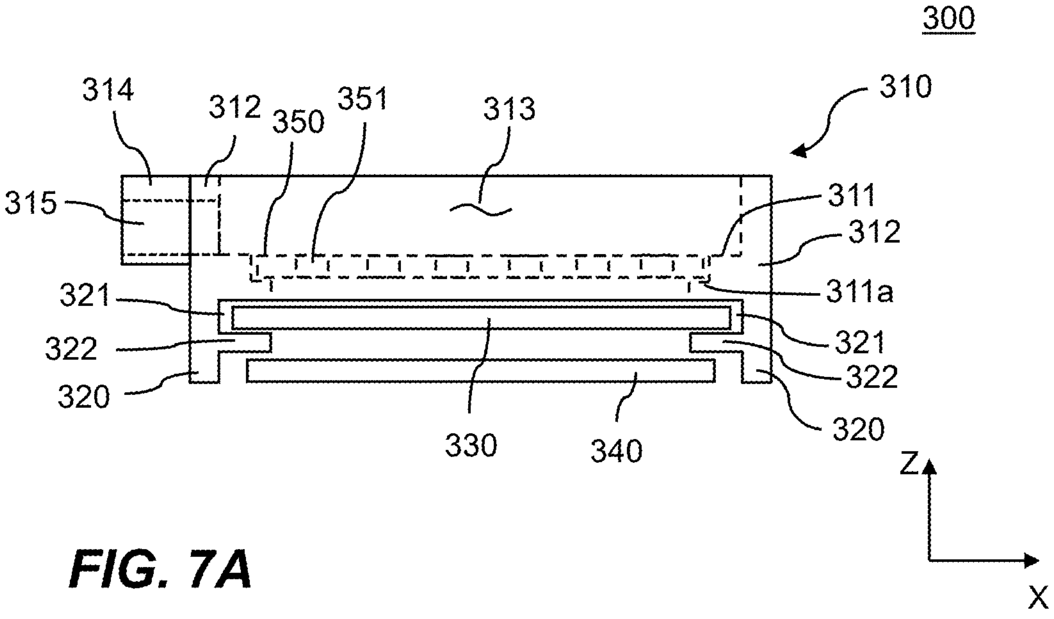
FIGS. 7A-7D are views of a front side, rear side, left side, and right side of the pill tray while the sieve plate, removable plate and dose tray are inserted in the pill tray.
Figure 7B:
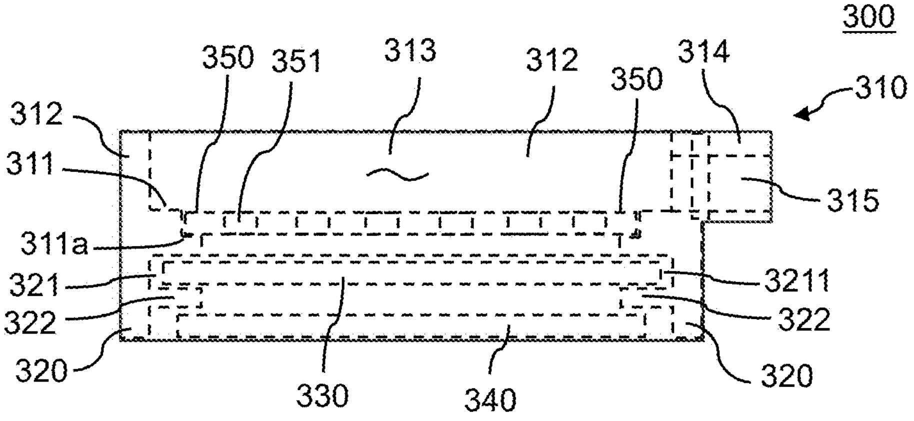
Figure 7C:
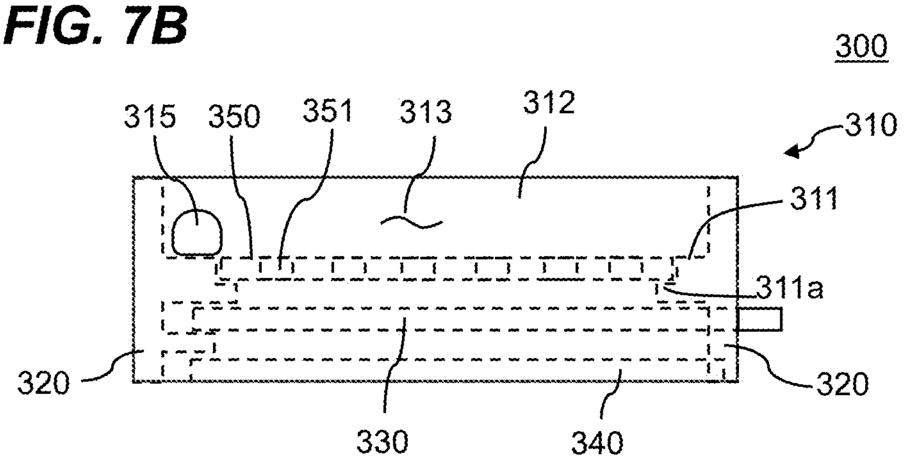
Figure 7D:
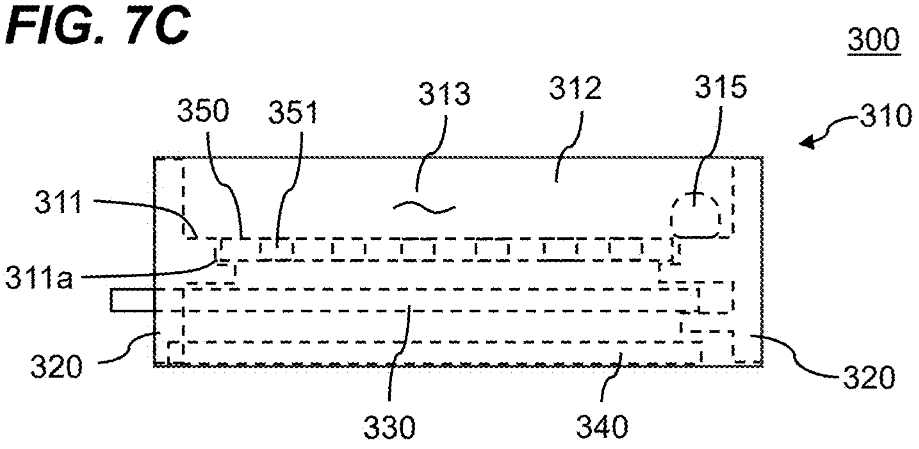
Figure 8A:
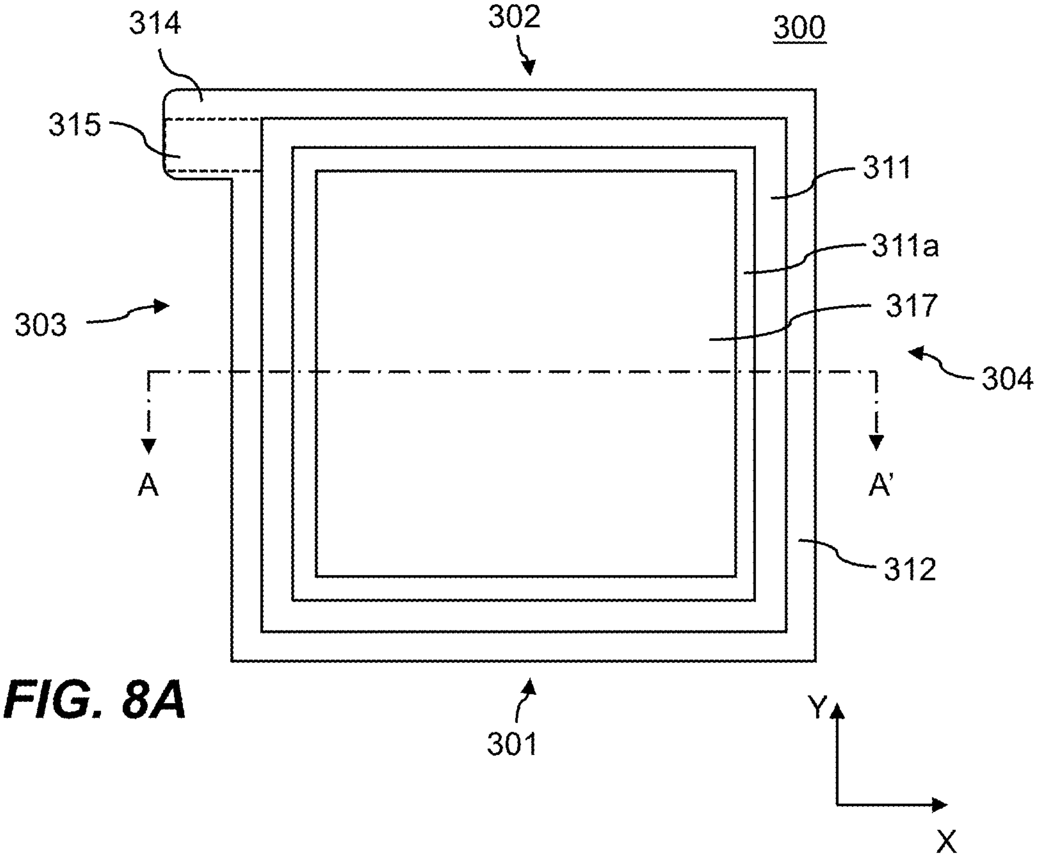
FIG. 8A is a top view of the pill tray when the sieve plate, removable plate and dose tray are removed.
Figure 8B:
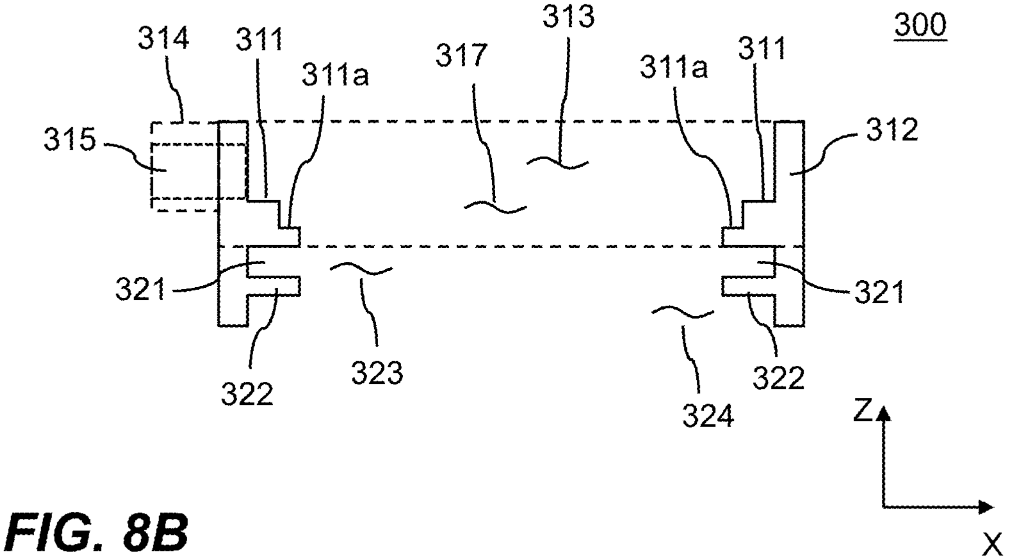
FIG. 8B is a cross-sectional view of the pill tray, along the line A-A' shown in FIG. 3A, without the sieve plate, removable plate and the dose tray 140.
Figure 9:
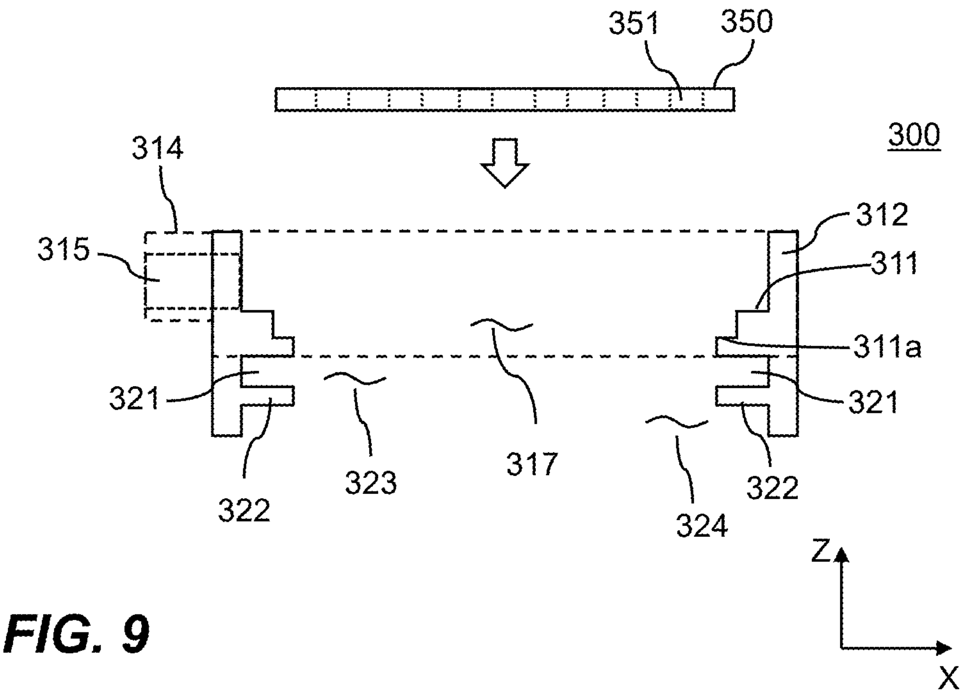
FIG. 9 is an illustration how the sieve plate may be place on the bottom substrate of the container.

With reference to FIG. 6, shown is a top view of the pill tray 300 of another embodiment of the disclosed invention while sieve plate 350, removable plate 330 and dose tray 340 are inserted in the lower section of the pill tray 300. With reference to FIGS. 7A-7D, shown are views of front side 301, rear side 302, left side 303, and right side 304 of the pill tray 300, respectively, while the sieve plate 350, removable plate 330 and dose tray 340 are inserted in the pill tray 300. With reference to FIG. 8A, shown is a top view of the pill tray 300 when the sieve plate 350, removable plate 330 and dose tray 340 are removed. With reference to FIG. 8B, shown is a cross-sectional view of the pill tray 300, along the line A-A' shown in FIG. 8A, without the sieve plate 350, removable plate 330 and the dose tray 340. With reference to FIG. 9, shown is an illustration how the sieve plate 350 may be placed on the bottom substrate 311. These views are exaggerated for description purposes. The difference between the pill tray 300 and the pill tray 100 shown in FIGS. 1-3 is that the pill tray 300 has opening 317 in the bottom substrate 311 and the sieve plate 350 is removably placed in the opening 317. In the pill tray 300, the sieve plate 350 is coupled to the bottom substrate 311, while in the pill tray 100 shown in FIGS. 1-3, a sieve plate having through holes is integrated into the bottom substrate 111 to provide a single body of a plate or substrate.

The pill tray 300 includes container 310 having bottom substrate 311 and walls 312 surrounding the bottom substrate 311. The walls 312 are disposed along the front side 301, rear side 302, left side 303, and right side 304 of the pill tray 300. The walls 312 protrude upwards from the bottom substrate 311 so that an inner space 313 is defined by the bottom substrate 311 and the walls 212. The inner space 313 may be completely enclosed by the walls 312. The bottom substrate 311 has an opening 317 (see FIG. 8B) that is configured to receive the sieve plate 350. The bottom substrate 311 has a recess 311*a* that is recessed from a top surface of the bottom substrate 311. The recess 311*a* may be formed along a periphery of the opening 317 to securely support the sieve plate 350.

When the sieve plate 350 is inserted in the opening 317, the sieve plate 350 sits on the recess 311*a* as shown in FIGS. 7A-7D. The sieve plate 350 is removably placed on the bottom substrate 311. When the sieve plate 350 is placed on the top of the recess 311*a*, the level of the top surface of the sieve plate 350 is at the same level of the top surface of the bottom substrate 311, so that the sieve plate 350 and the bottom substrate 311 together may form a flat surface. When the sieve plate 350 is inserted in the opening 317, the inner space 313 may be a space defined by the bottom substrate 311, sieve plate 350, and the walls 312. The inner space 313 is configured to contain objects such as pills or tablets. The container 310 may have the shape of a box with an open top. FIG. 6 shows an exemplary top view of the container 310 having a rectangular shape. However, the shape is not limited to the rectangular shape.

The container 310 further includes an exit portion 314 at a corner of the container 310. The exit portion 314 has an exit opening (though hole) 315 open to the outside and the inner space 313. Therefore, objects contained in the inner space 313 may be removed outside through the exit opening 315. The exit opening 315 may be formed on one of the walls 312. Walls 312 except the portion of the exit opening 315 are plain solid walls without any openings or grooves. The exit opening 315 is positioned on or above the bottom substrate 311. FIG. 6 shows an exemplary exit portion 314 located at a corner of the container 310. However, the exit portion 314 with the exit opening 315 may be located at any other portion of the container 310.

The sieve plate 350 includes a plurality of through holes 351 so that objects inside the inner space 313 may also be removed through the through holes 351. Each through hole 351 may be constructed to contain a single object. However, depending on applications, each through hole 351 may be constructed to contain multiple objects. FIGS. 6-8B show a certain number, shape, size, and orientation of the through holes 351. However, the number, shape, size, and orientation of the through holes 351 are not limited to those shown in FIGS. 6-8B. For example, the through holes 351 (when viewed from the top) may have circular shapes, oval shapes, rectangular shapes, square shapes, etc. depending on applications. The through holes 351 of the sieve plate 350 may have all the same shape or may be a combination of different shapes. For example, some of the through holes 351 of the sieve plate 350 may have an oval shape while the other through holes 351 of the sieve plate 350 may have a rectangular shape.

FIGS. 6-8B show a single exit portion 314. However, the pill tray 300 of the disclosed invention may have multiple exit portions. The shape and size of the exit opening 315 are not limited to those shown in FIG. 6-8B.

The pill tray 300 further includes legs 320 disposed under the container 310. The legs 320 may be attached to a lower surface of the bottom substrate 311 to support the container 310. In an embodiment, the legs 320 are integrated with the walls 312 to form a single structure. Therefore, in this embodiment, the integrated legs 320 and walls 312 form walls at the rear, left and right sides 302-304 of the container 310, while the front side 301 may not have the leg 320 so that the removable plate 330 and dose tray 340 are inserted under the bottom substrate 311 along the Y-axis. The locations and shapes of the legs 320, however, are not limited to those shown in FIGS. 7A-7D, but may have different structures.

The pill tray 300 includes removable plate 330 that may be a plain solid plate without any openings or grooves. The legs 320 include slots 321 extending along Y-axis to receive the removable plate 330. The slots 321 are positioned at upper portions of the legs 320, and define a first space 323 just under the bottom substrate 311, which is configured to receive the removable plate 330. The removable plate 330 may be slidably inserted into the first space 323 via the slots 321. The slots 321 guide and support the removable plate 330 to be stably placed under the bottom substrate 311. When completely inserted, the removable plate 330 entirely covers the through holes 351 formed on the sieve plate 350. Therefore, the removable plate 330 prevents objects in the inner space 313 of the container 310 from dropping through the though holes 351. In order to define the slots 321, the legs 320, for example, may include protrusions or rails 322 that extend along Y-axis as shown in FIGS. 7A and 8B. However, the legs 320 may have other structures, such as dents on the surfaces, to define the slots 321.

The pill tray 300 provides a second space 324 under the bottom substrate 311 to receive the dose tray 340. The second space 324 may be defined by lower portions of the legs 320, which do not have the slots 321 and are below the upper portions of the legs 320 at which the slots 321 are formed. When the rails 322 are formed, the upper portions of the legs 320 are the portions above the rail 322 and the lower portions of the legs 320 are the portions below the rail 322. Therefore, the second space 324 is under the first space 323 defined by the slots 321. When inserted, the dose tray 340 is positioned below the removable plate 330. The dose tray 340 may be the same dose tray 140 described referring to FIG. 4.

Figure 10:
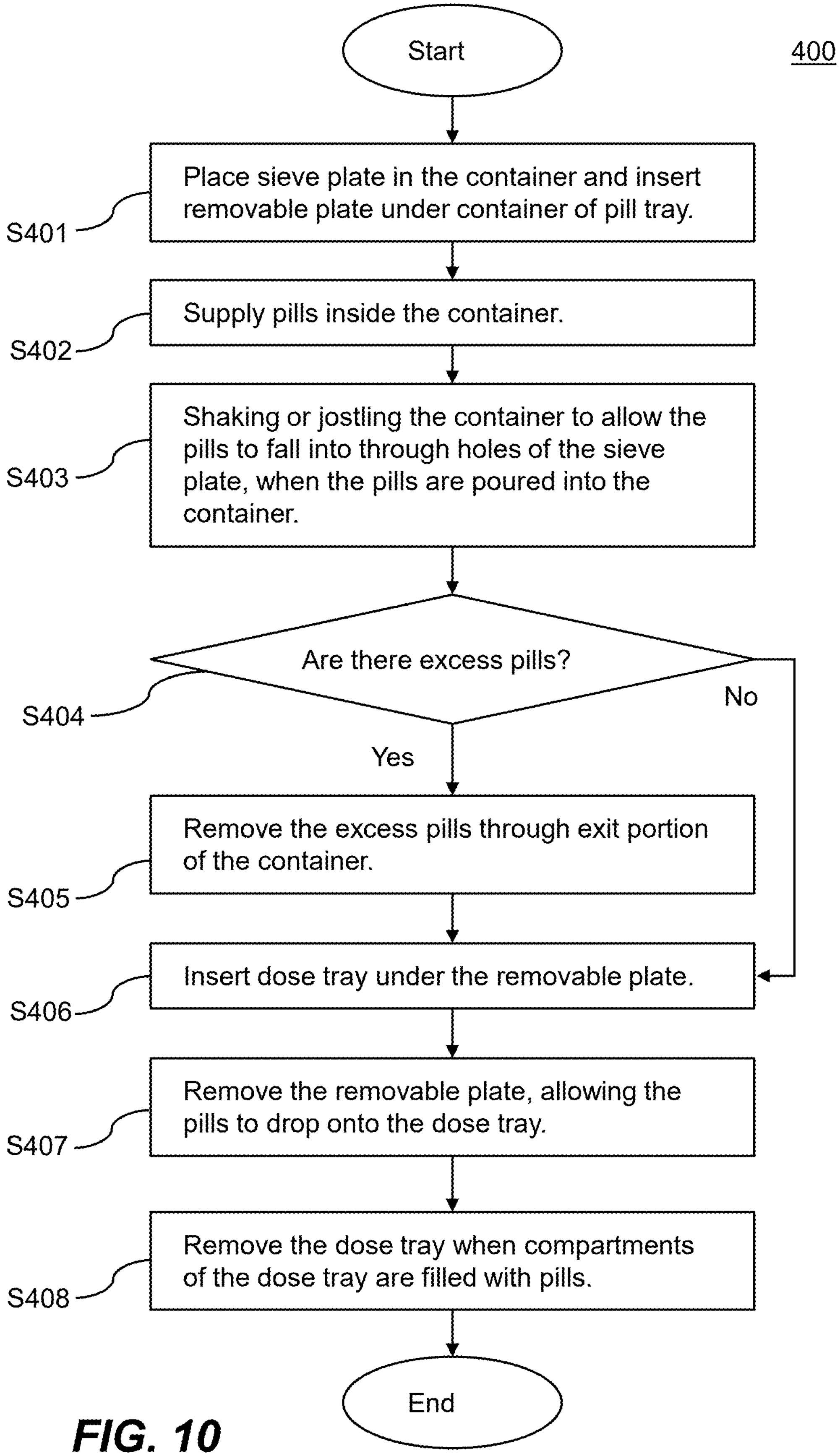
FIG. 10 is a workflow of the method of using the pill tray of the disclosed invention.

With reference to FIG. 10, shown is a workflow of the method 400 of using the pill tray 300 of the disclosed invention. The sieve plate 350 is placed in the container as shown in FIGS. 7A-7D, and the removable plate 310 is inserted under container 310 of pill tray 300 through the slots 321, block S401. Pills are supplied inside the container 310, block S402. The pills in the container 310 is distributed inside through holes 351 of the sieve plate 350, block S403. For example, in order to distribute the pills inside the through holes 351, the pill tray 300 may be shaken until the through holes 351 are filled with the pills. When the number of pills in the container 310 is greater than the number of through holes 351, there may be excess pills that are not distributed in any of the through holes 351. If there are excess pills in the container 310, block S404, the excess pills are removed through exit portion 314 of the container 310, block S405. For example, the pill tray 300 may be tilted to lower the exit portion 314. Then, the excess pills may be removed through the exit opening 315 of the exit portion 314. When pills are distributed in the through holes 351 without excess pills, dose tray 340 is inserted under the removable plate 330, block S406. The position of the dose tray 340 may be adjusted to align the compartments 341 to the through holes 351. The removable plate 330 is removed, allowing the pills to drop onto the dose tray 340 through the through holes 351, block S407. The dropped pills are contained in the compartments 141 of the dose tray 340. The dose tray 340 is removed when compartments of the dose tray are filled with pills, block S408.

Figure 11:
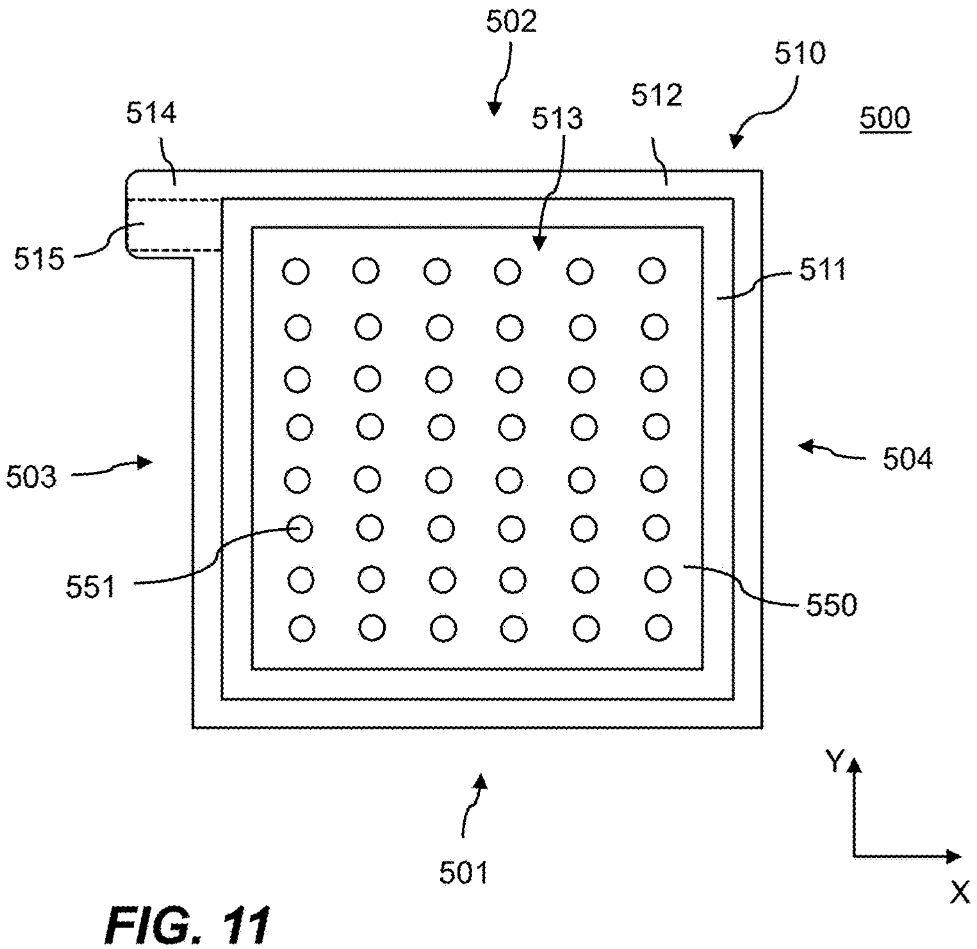
FIG. 11 is a top view of the pill tray of still another embodiment of the disclosed invention while a sieve plate, removable plate and dose tray are inserted in the pill tray.
Figure 12A:
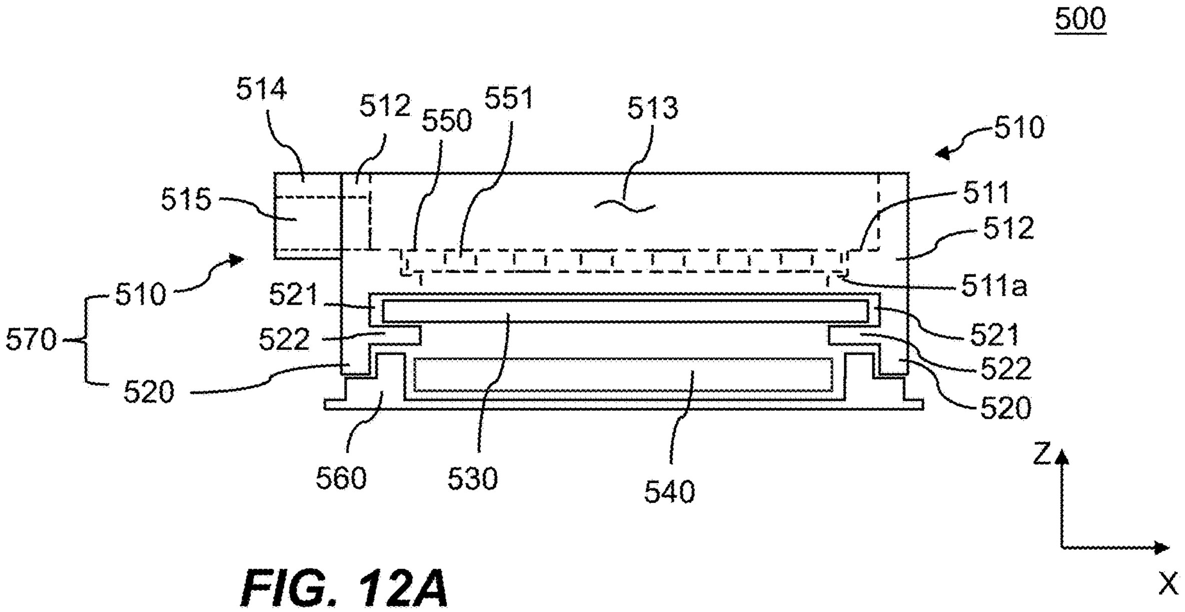
FIGS. 12A-12D are views of a front side, rear side, left side, and right side of the pill tray while the sieve plate, removable plate and dose tray are inserted in the pill tray.
Figure 12B:
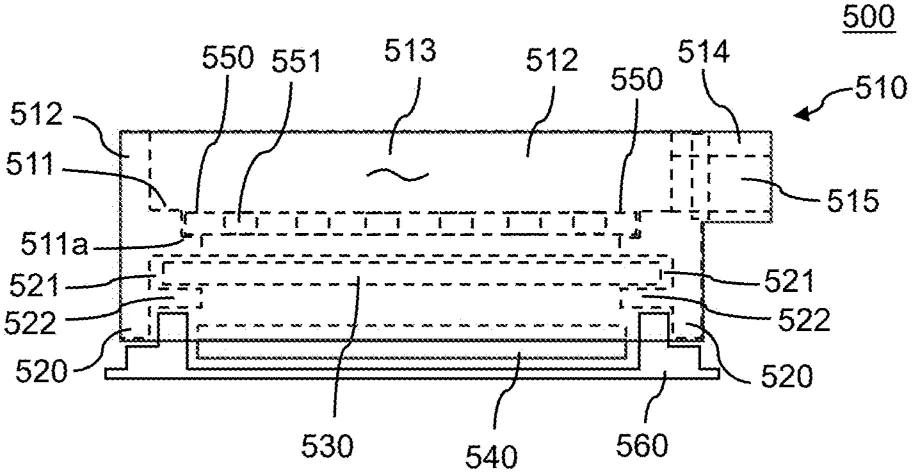
Figure 12C:
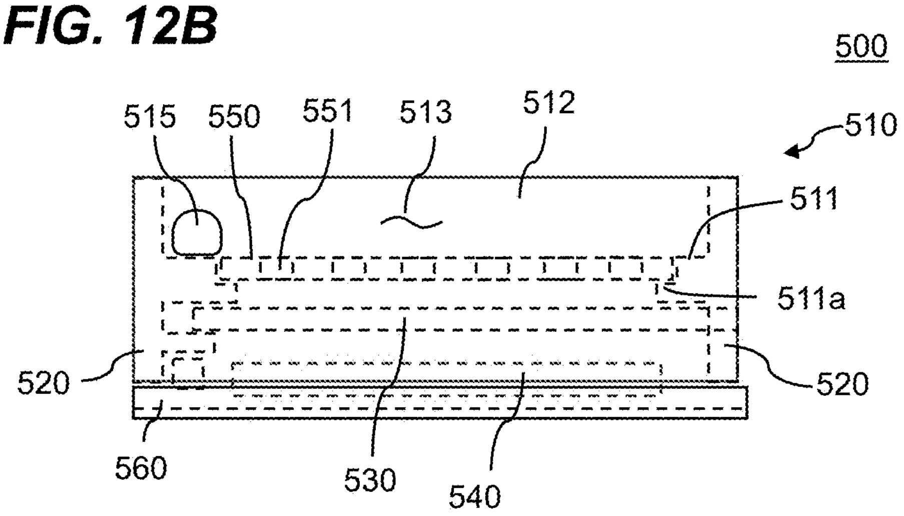
Figure 12D:
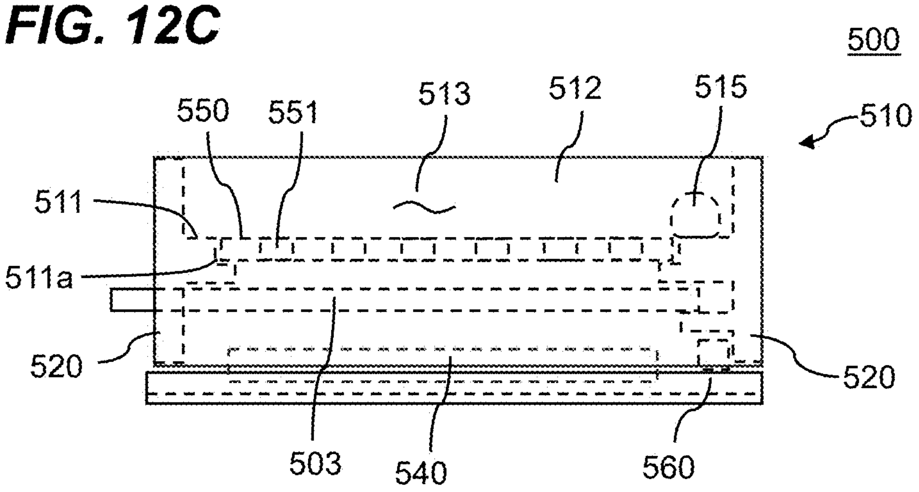
Figure 13A:
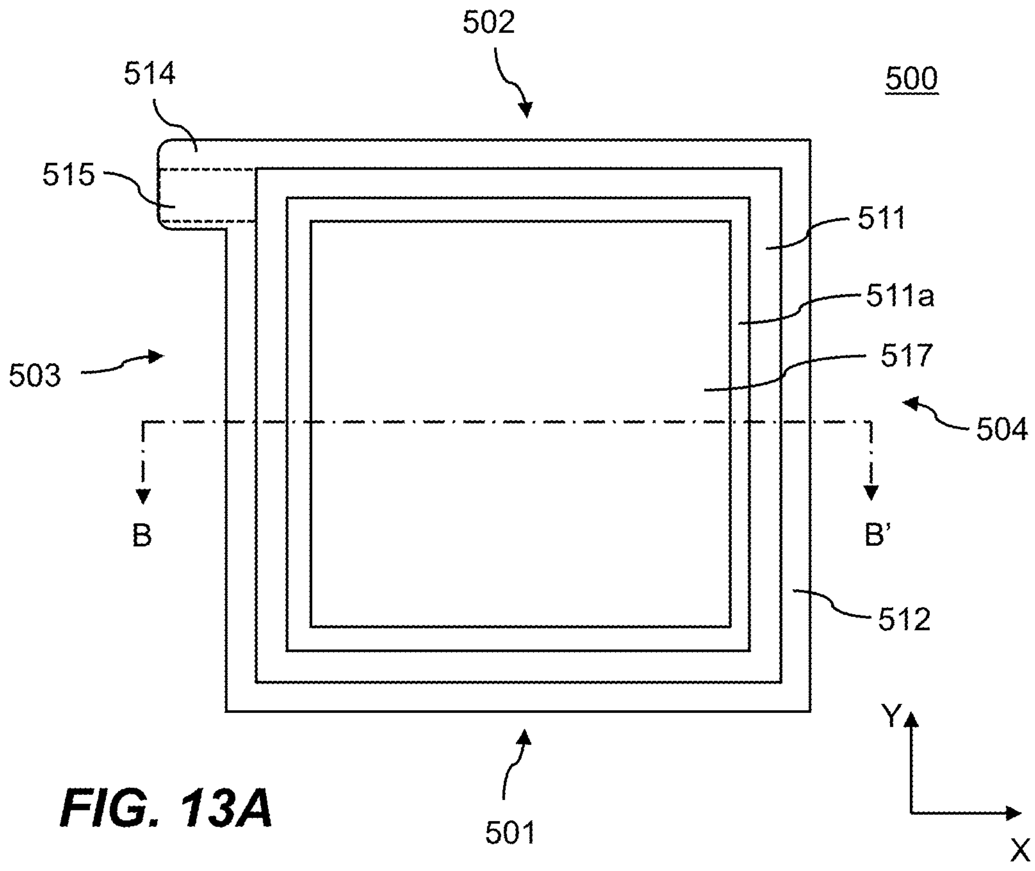
FIG. 13A is a top view of the pill tray when the sieve plate, removable plate and dose tray are removed.
Figure 13B:
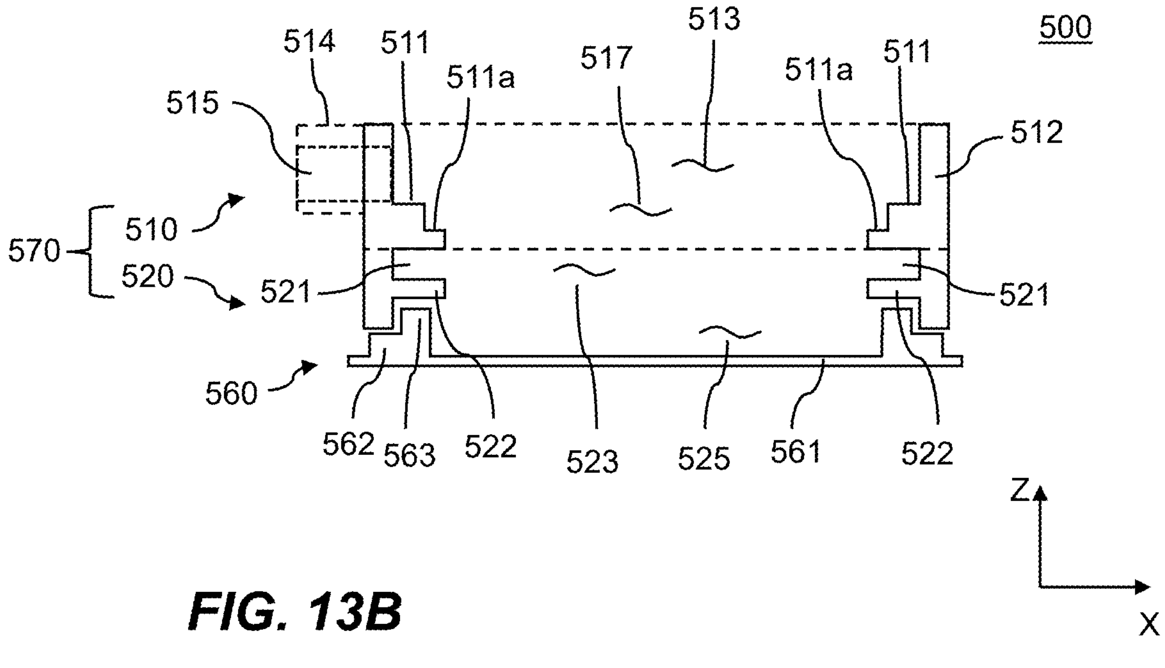
FIG. 13B is a cross-sectional view of the pill tray, along the line A-A' shown in FIG. 3A, without the sieve plate, removable plate and the dose tray 140.
Figure 14A:
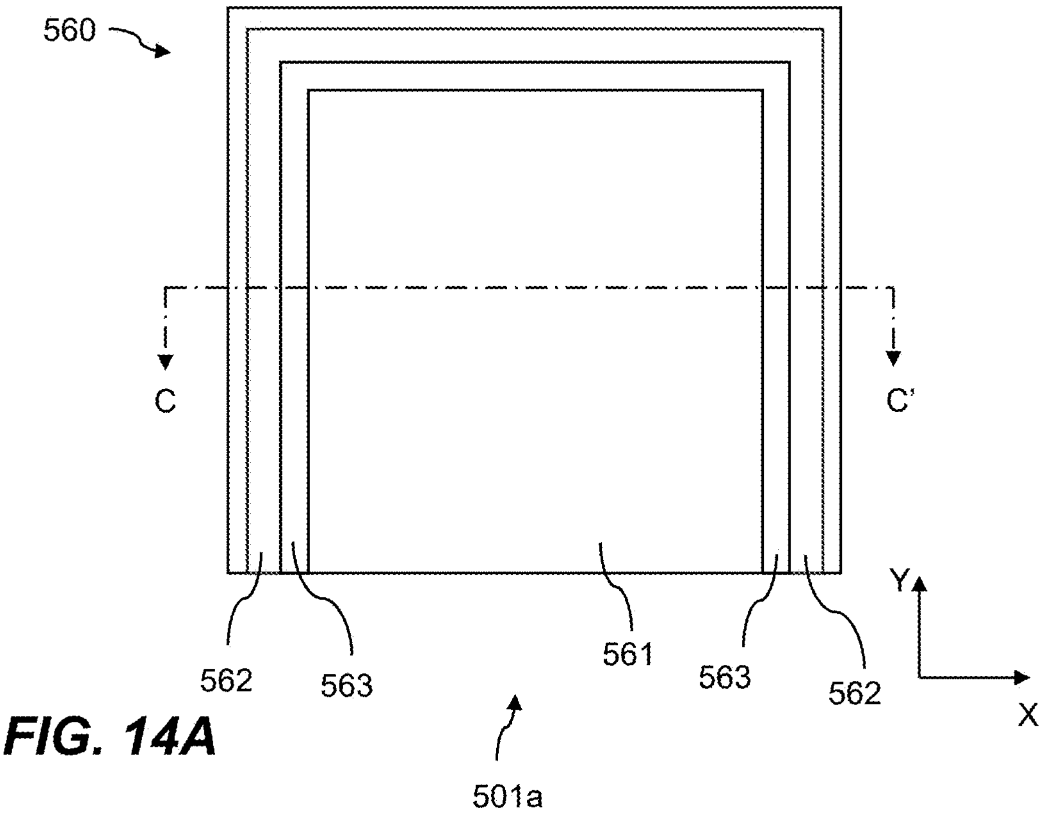
FIG. 14A is a top view of the tray frame of the pill tray.
Figure 14B:
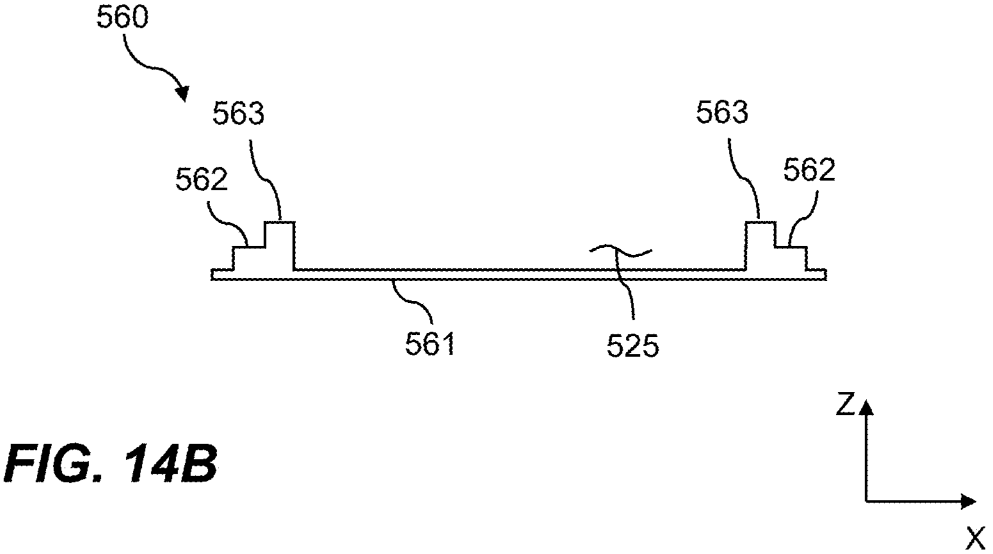
FIG. 14B is a cross-sectional view of the tray frame along the line B-B' shown in FIG. 4A.
Figure 15:
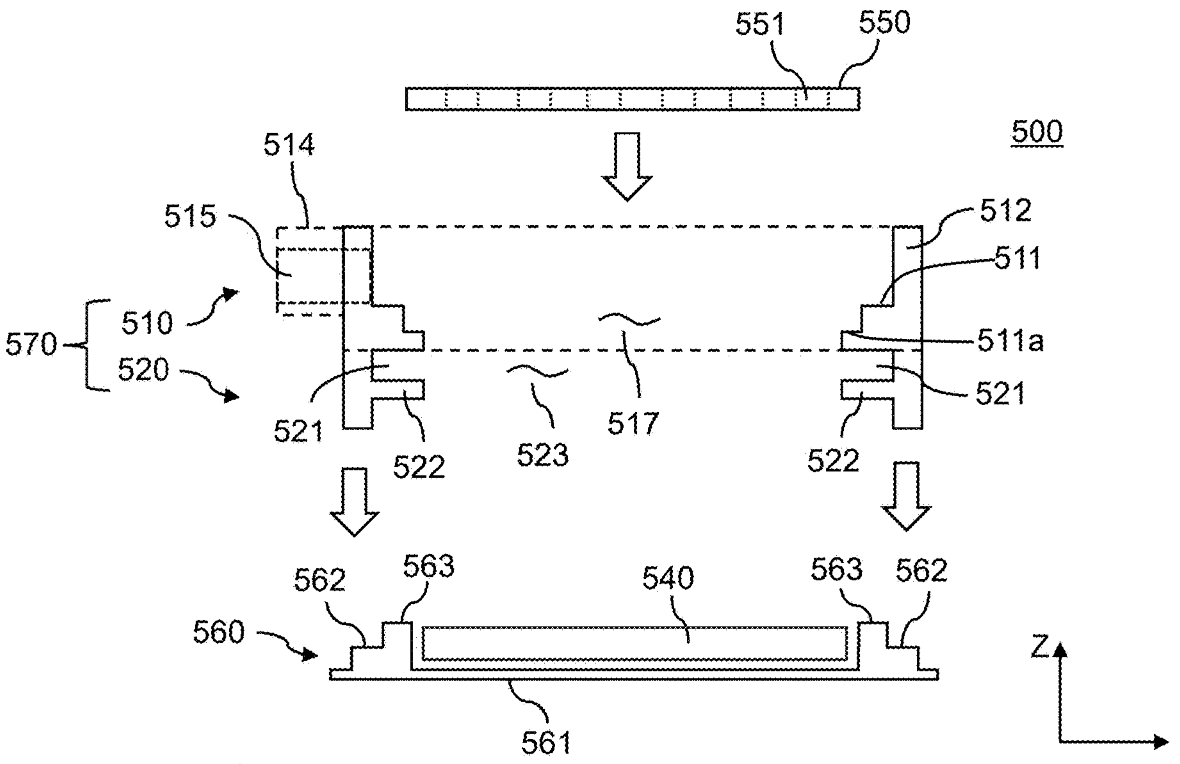
FIG. 15 is an illustration how the sieve plate may be place on the bottom substrate and the pill tray body may be placed on the tray frame.

With reference to FIG. 11, shown is a top view of the pill tray 500 of still another embodiment of the disclosed invention while sieve plate 550, removable plate 530 are inserted in the container 510 and the dose tray 540 is placed inside the dose tray frame 560. With reference to FIGS. 12A-12D, shown are views of front side 501, rear side 502, left side 503, and right side 504 of the pill tray 500, respectively, while sieve plate 550, removable plate 530 are inserted in the container 510 and the dose tray 540 is placed inside the dose tray frame 560. With reference to FIG. 13A, shown is a top view of the pill tray 500 when the sieve plate 550, removable plate 530 and dose tray 540 are removed. With reference to FIG. 13B, shown is a cross-sectional view of the pill tray 500, along the line B-B' shown in FIG. 13A, without the sieve plate 550, removable plate 530 and the dose tray 540. With reference to FIG. 14A, shown is a top view of the tray frame 560 of the pill tray 500. With reference to FIG. 14B is a cross-sectional view of the tray frame 560 along the line C-C' shown in FIG. 14A. With reference to FIG. 15, shown is an illustration how the sieve plate 550 may be placed on the bottom substrate 511 and the pill tray body 570 may be placed on the tray frame 560. These views are exaggerated for description purposes. The difference between the pill tray 500 and the pill trays 300 shown in FIGS. 6-9 is that the pill tray 500 employs pill tray frame 560 that supports the pill tray body 570 and accommodates the dose tray 540.

The pill tray 500 includes pill tray body 570 and tray frame 560 configured to be placed under the pill tray body 570. The tray frame 560 is configured to receive dose tray 540. The pill tray body 570 includes container 510 and legs 520. The container 510 includes bottom substrate 511 and wall 512 surrounding the bottom substrate 511. The walls 512 are disposed along the front side 501, rear side 502, left side 503, and right side 504 of the container 510. The walls 512 protrude upwards from the bottom substrate 511 so that an inner space 513 is defined by the bottom substrate 511 and the walls 512. The inner space 513 may be completely enclosed by the walls 512. The bottom substrate 511 has an opening 517 (see FIG. 13B) that is configured to receive the sieve plate 550. The bottom substrate 511 has a recess 511*a* that is recessed from a top surface of the bottom substrate

511. The recess 511*a* may be formed along a periphery of the opening 517 to securely support the sieve plate 550 when the sieve plate 550 is placed in the opening 517.

When the sieve plate 550 is inserted in the opening 517, the sieve plate 550 sits on the recess 511*a* as shown in FIG. 12A-12D. The sieve plate 550 is removably placed on the bottom substrate 511. When the sieve plate 550 is placed on the top of the recess 511*a*, the level of the top surface of the sieve plate 550 is at the same level of the top surface of the bottom substrate 511, so that the sieve plate 550 and the bottom substrate 511 together may form a flat surface. When the sieve plate 550 is inserted in the opening 517, the inner space 513 may be a space defined by the bottom substrate 511, sieve plate 550, and the walls 512. The inner space 513 is configured to contain objects such as pills or tablets. The container 510 may have the shape of a box with an open top. FIG. 1 shows a top view of the container 510 having a rectangular shape. However, the shape is not limited to the rectangular shape.

The container 510 further includes an exit portion 514 at a corner of the container 510. The exit portion 514 has an exit opening (though hole) 515 open to the outside and the inner space 513. Therefore, objects contained in the inner space 513 may be removed outside through the exit opening 515. The exit opening 515 may be formed on one of the walls 512. Walls 512 except the portion of the exit opening 515 are plain solid walls without any openings or grooves. The exit opening 515 is positioned on or above the bottom substrate 511. FIG. 11 shows an exemplary exit portion 514 located at a corner of the container 510. However, the exit portion 514 with the exit opening 515 may be located at any other portion of the container 510. FIGS. 11-13B show a single exit portion 514. However, the pill tray 500 of the disclosed invention may have multiple exit portions.

The sieve plate 550 includes a plurality of through holes 551 so that objects inside the inner space 513 may also be removed through the through holes 551. Each through hole 551 may be constructed to contain a single object. However, depending on applications, each through hole 551 may be constructed to contain multiple objects. FIGS. 11-13B show a certain number, shape, size, and orientation of the through holes 551. However, the number, shape, size, and orientation of the through holes 551 are not limited to those shown in FIGS. 11-13B. For example, the through holes 551 (when viewed from the top) may have circular shapes, oval shapes, rectangular shapes, square shapes, etc. depending on applications. The through holes 551 of the sieve plate 550 may have all the same shape or may be a combination of different shapes. For example, some of the through holes 551 of the sieve plate 550 may have an oval shape while the other through holes 551 of the sieve plate 550 may have a rectangular shape. The shape and size of the exit opening 515 are not limited to those shown in FIG. 11-13B.

The pill tray 500 further includes legs 520 disposed under the container 510. The legs 520 may be attached to a lower surface of the bottom substrate 511 to support the container 510. In an embodiment, the legs 520 may be integrated with the walls 512 to form a single structure. Therefore, in this embodiment, the integrated legs 520 and walls 512 form walls at the rear, left and right sides 502-504 of the container 510, while the front side 501 may not have the leg 520 so that the removable plate 530 is inserted under the bottom substrate 511 along the Y-axis. In another embodiment, the legs 520 may be mechanically coupled to the walls 512. The locations and shapes of the legs 520, however, are not limited to those shown in FIGS. 12A-12D, but may have different structures. In the descriptions, the assembly of the container 510 and the legs 520 is referred to as pill tray body 570.

The pill tray 500 includes removable plate 530 that may be a plain solid plate without any openings or grooves. The legs 520 include slots 521 extending along Y-axis to receive the removable plate 530. The slots 521 are positioned at upper portions of the legs 520, and define a first space 523 just under the bottom substrate 511, which is configured to receive the removable plate 530. The removable plate 530 may be slidably inserted into the first space 523 defined by the slots 521. The slots 521 guide and support the removable plate 530 to be stably placed under the bottom substrate 511. When completely inserted, the removable plate 530 entirely covers the through holes 551 formed on the sieve plate 550. Therefore, the removable plate 530 prevents objects in the inner space 513 of the container 510 from dropping through the though holes 551. In order to define the slots 521, the legs 520, for example, may include protrusions or rails 522 that extend along Y-axis as shown in FIGS. 12A and 13B. However, the legs 520 may have other structures, such as dents on the surfaces, to define the slots 521.

The pill tray 500 includes tray frame 560 to accommodate the dose tray 540 and to support the container 510. The tray frame 560 is configured to support the pill tray body 570 when the pill tray body 570 is placed on the tray frame 560. The tray frame 560 includes bottom plate 561 and supporters 562 protruding upwardly from the bottom plate 561. The bottom plate 561 and the supporters 562 define frame inner space 525. The dose tray frame 560 is configured to receive the dose tray 540 in the frame inner space 525. As shown in FIG. 14A, the supporters 562 may not be formed on the front side 501*a* of the tray frame 560 to receive the dose tray 540. The supporters 562 are configured to contact or be coupled with the legs 520 to securely support the container 510 when the pill tray body 570 is placed on the tray frame 560. The supporter 562 may include step 563 to securely hold the pill tray body 570. For example, as shown in FIG. 13B, the rails 522 may be placed on the steps 563 while the legs 520 are placed on the supporters 562. In this embodiment, the steps 563 are placed in the second space 124, 324 shown in FIGS. 3 and 9, and is placed between lower portions and the legs 120, 320, and 520. The frame space 525 corresponds to the second spaces 124 and 324 and receives the dose tray 540. The frame space 525 is included in or overlaps with the second space 124, 324. However, the step 563 is one of the examples to securely hold the container 510 on the tray frame 560. Other structures may be employed to securely hold the container 510 on the tray frame 560. The dose tray 540 may be the same dose tray 140 described referring to FIG. 4.

Figure 16:
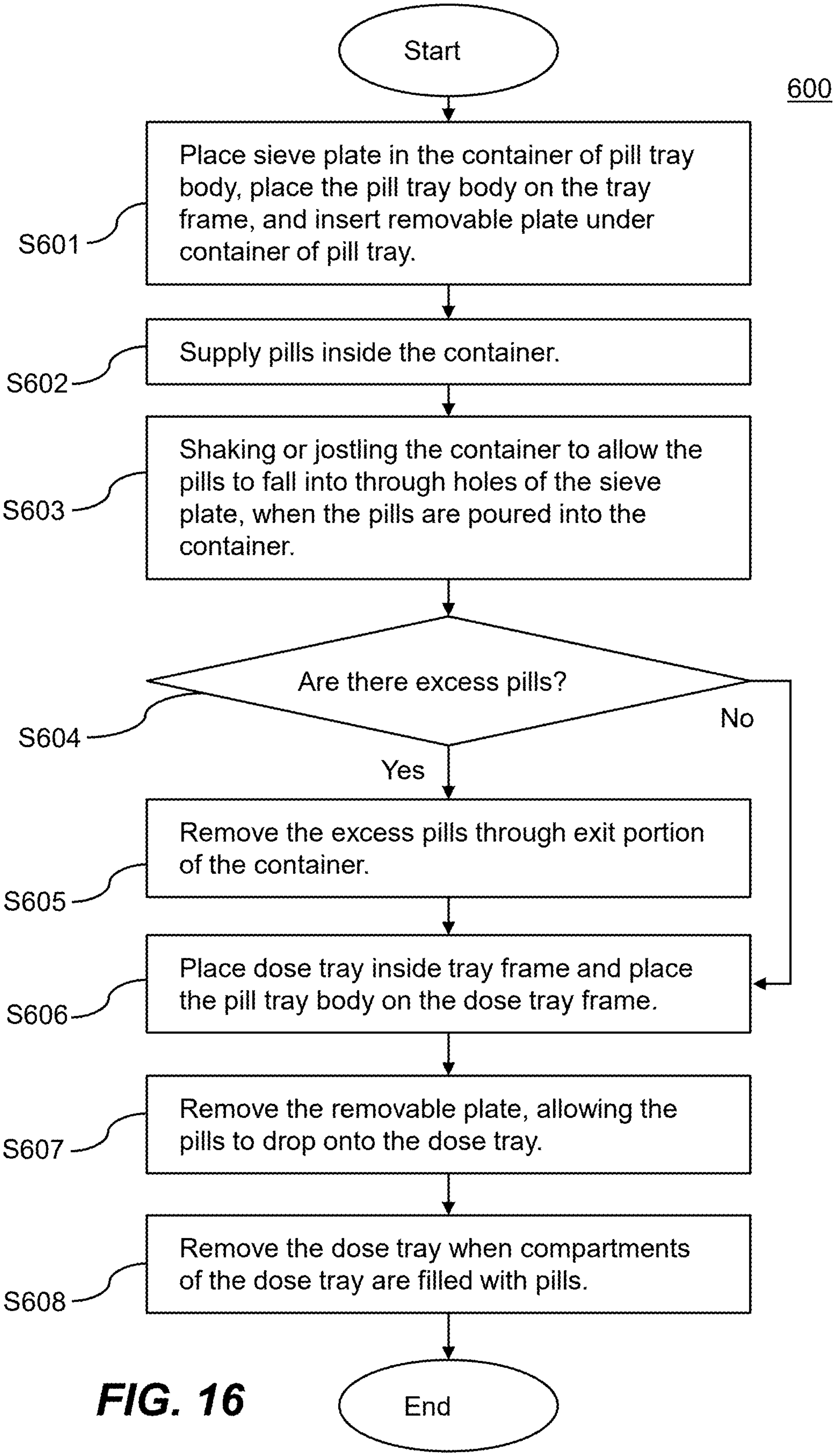
FIG. 16 is a workflow of the method of using the pill tray of the disclosed invention.

With reference to FIG. 16, shown is a workflow of the method 600 of using the pill tray 500 of the disclosed invention. The sieve plate 550 is placed in the container as shown in FIGS. 12A-12D, the pill tray body 570 is placed on the tray frame 560, and the removable plate 510 is inserted under the container 510 of the pill tray body 570 of the pill tray 500 through the slots 121, block S601. Pills supplied inside the container 510, block S602. The pills in the container 510 are distributed inside through holes 551 of the sieve plate 550, block S603. For example, in order to distribute the pills inside the through holes 551, the pill tray 500 may be shaken until the through holes 551 are filled with the pills. When the number of pills in the container 510 is greater than the number of through holes 551, there may be excess pills that are not distributed in any of the through holes 551. If there are excess pills in the container 510, block S604, the excess pills are removed through exit portion 514 of the container 510, block S605. For example, the pill tray 500 may be tilted to lower the exit portion 514. Then, the excess pills may be removed through the exit opening 515 of the exit portion 514. When pills are distributed in the through holes 551 without excess pills, dose tray 540 is placed inside the tray frame 560, and thereafter, the pill tray body 570 is placed on the tray frame 560, block S606. In this step, the dose tray 540 is positioned under the removable plate 530. Then, the removable plate 530 is removed, allowing the pills to drop onto the dose tray 540 through the through holes 551, block S607. The dropped pills are contained in the compartments 141 of the dose tray 540. The dose tray 540 is removed when compartments of the dose tray are filled with pills, block S608.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A pill tray, comprising:

a container comprising a bottom substrate and walls surrounding the bottom substrate and protruding upwardly from the bottom substrate to provide an inner space to contain one or more objects;

a plurality of legs disposed under the container to support the container, wherein upper portions of the plurality of legs comprise a plurality of slots defining a first space under the bottom substrate and between the plurality of slots, and lower portions of the plurality of legs define a second space between the lower portions of the plurality of legs under the first space;

a sieve plate coupled to the bottom substrate, wherein the sieve plate has a plurality of through holes configured to receive the one or more objects in the container; and a removable plate removably disposed in the first space under the bottom substrate of the container, wherein the plurality of slots of the plurality of legs are configured to receive, support and guide the removable plate, wherein the removable plate is a plain solid plate configured to entirely cover the through holes of the sieve plate, and wherein the lower portions of the plurality of legs are configured to receive a dose tray in the second space.

2. The pill tray of claim 1 wherein the bottom substrate has an opening and a recess, which is recessed from a top surface of the bottom substrate, along a periphery of the opening and the sieve plate is removably disposed in the opening of the bottom substrate and is supported by the recess.

3. The pill tray of claim 1 wherein the sieve plate is integrated into the bottom substrate to provide a single body of the sieve plate and the bottom substrate.

4. The pill tray of claim 1 wherein a level of a top surface of the sieve plate is at the same level of a top surface of the bottom substrate.

5. The pill tray of claim 1 wherein the container comprises an exit portion including an exit opening, through which the one or more objects in the inner space are removed outside.

6. The pill tray of claim 5 wherein the exit opening is positioned on or above the bottom substrate.

7. The pill tray of claim 5 wherein the exit portion is placed at a corner of the container.

8. The pill tray of claim 1 wherein the plurality of legs comprise protrusions protruding inwardly to provide the plurality of slots between the protrusions and the bottom substrate.

9. The pill tray of claim 1 further comprising a tray frame disposed under the plurality of legs, wherein the tray frame comprises a bottom plate and a plurality of supporters protruding upwardly from the bottom plate, the plurality of supporters and the bottom plate define a frame inner space between the plurality of supporters to receive the dose tray, and the frame space is included in or overlaps with the second space.

10. The pill tray of claim 9 wherein the plurality of supporters of the tray frame comprise steps to securely support the plurality of legs, and the steps are placed between the lower portions of the plurality of legs.

11. The pill tray of claim 1 wherein each through hole of the sieve plate is configured to receive a single object.

12. The pill tray of claim 1 wherein the inner space is completely enclosed by the walls.

13. The pill tray of claim 1 wherein the container comprises an exit portion including an exit opening formed on one of the walls, through which the one or more objects in the inner space are removed outside, and wherein the exit opening is positioned on or above the bottom substrate.

14. A method of using a pill tray, comprising:

placing a sieve plate in a container of the pill tray and inserting a removable plate under a bottom substrate of the container of the pill tray through a plurality of slots, wherein the bottom substrate of the container has an opening and a recess, which is recessed from a top surface of the bottom substrate, along a periphery of the opening, wherein the sieve plate is disposed on the recess and the sieve plate has a plurality of through holes configured to receive one or more pills in the container, wherein the pill tray comprises a plurality of legs under the container to support the container, wherein the plurality of legs comprise the plurality of slots defining a first space under the bottom substrate of the container and between the plurality of slots, into which the removable plate is removably inserted, the plurality of slots being configured to receive, support and guide the removable plate, and wherein the removable plate is a plain solid plate configured to entirely cover the through holes of the sieve plate;

supplying the one or more pills inside the container;

distributing the one or more pills inside the through holes formed on the sieve plate;

removing one or more excess pills that are not distributed in the through holes;

inserting dose tray under the removable plate;

removing the removable plate, allowing the one or more pills dropping onto the dose tray through the through holes; and removing the dose tray.

15. The method of claim 14 further comprising placing a tray frame under the plurality of legs to support the container and plurality of legs, wherein the tray frame comprises a bottom plate and a plurality of supporters protruding upwardly from the bottom plate, the plurality of supporters and the bottom plate define a frame inner space between the plurality of supporters to receive the dose tray.

16. The method of claim 14 wherein the distributing the one or more pills comprises shaking the pill tray until the through holes are filled with the one or more pills.

17. The method of claim 14 wherein the removing one or more excess pills comprises removing the one or more excess pills through an exit opening formed in the container.

18. The method of claim 17 wherein the exit opening is positioned on or above the bottom substrate.

19. The method of claim 14 wherein a level of a top surface of the sieve plate is at the same level of the top surface of the bottom substrate.

20. The method of claim 14 wherein the plurality of legs comprise protrusions protruding inwardly to provide the plurality of slots between the protrusions and the bottom substrate.

* * * * *